W. MULHOLLAND.

TRACTOR.

APPLICATION FILED OCT. 3, 1913.

1,120,326. Patented Dec. 8, 1914.

3 SHEETS—SHEET 1.

Witnesses:

P. F. Nagle.

H. C. Dieterich

Inventor

William Mulholland

By Wiedersheim & Fairbanks

Attorneys.

Figure 4B:
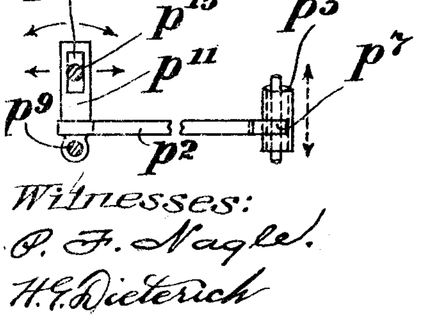
Figure 4A:
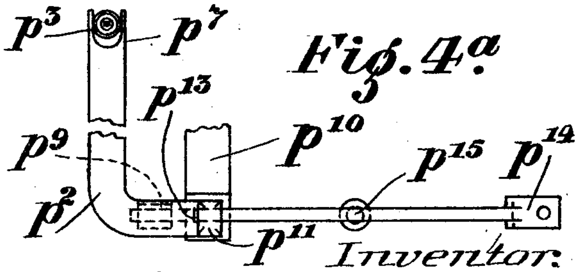

W. MULHOLLAND.
TRACTOR.
APPLICATION FILED OCT. 3, 1913.
1,120,326.
Patented Dec. 8, 1914.
3 SHEETS—SHEET 2.
Fig. 3.
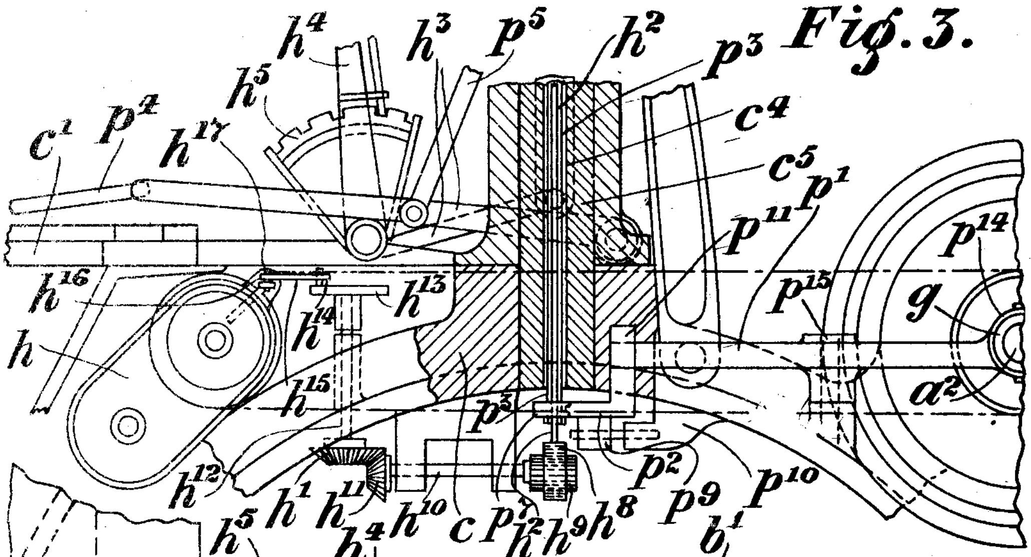
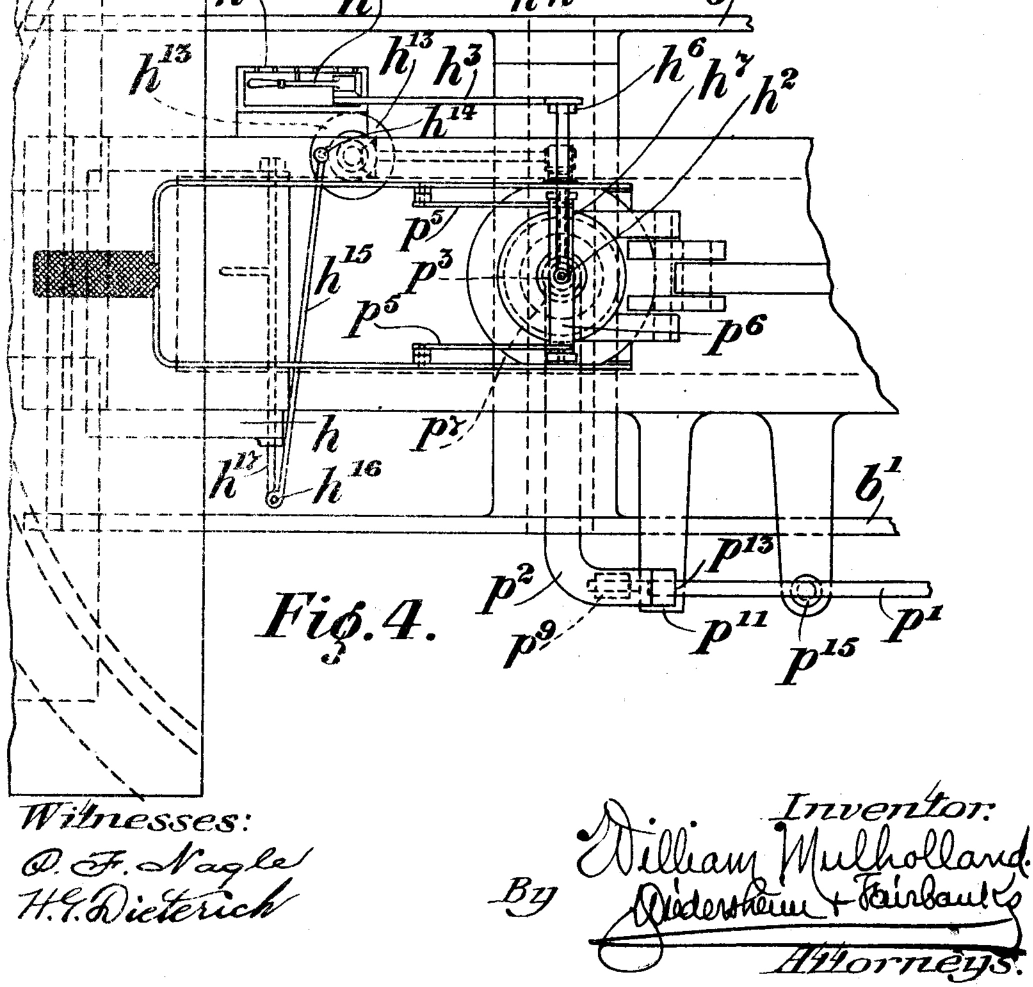
Fig. 4.
Witnesses:
O. F. Nagle
H. G. Dieterich
Inventor:
William Mulholland
By Wiedersheim & Fairbanks
Attorneys.

W. MULHOLLAND.

TRACTOR.

APPLICATION FILED OCT. 3, 1913.

1,120,326. Patented Dec. 8, 1914

3 SHEETS—SHEET 3.

Witnesses:
P. F. Nagle.
H. G. Dieterich

Inventor:
William Mulholland
By Wiedersheim & Fairbanks
Attorneys

UNITED STATES PATENT OFFICE.

WILLIAM MULHOLLAND, OF BELFAST, IRELAND.

TRACTOR.

[illegible] Specification of Letters Patent. Patented Dec. 8, 1914.

Application filed October 3, 1913. Serial No. 793,169.

To all whom it may concern:

Be it known that I, WILLIAM MULHOLLAND, a subject of the King of Great Britain, residing at Belfast, Ireland, have invented a new and useful Tractor, of which the following is a specification.

This invention relates to self contained and [illegible] power units for the [illegible] commercial, agricultural, and [illegible] and other purposes of the [illegible] the self contained power [illegible] for the propulsion of vehicles [illegible] liquid when required, for [illegible] motive power for other purposes, the power unit being so constructed and arranged that the power unit may be used for [illegible], for instance, it may be used by a farmer for his market cart, then [illegible] it may be adapted to operate [illegible] implements, or it may be used [illegible] of hay and in fact it may be used for any purpose for which a farmer, and [illegible] others require traction or power.

Figure 1:
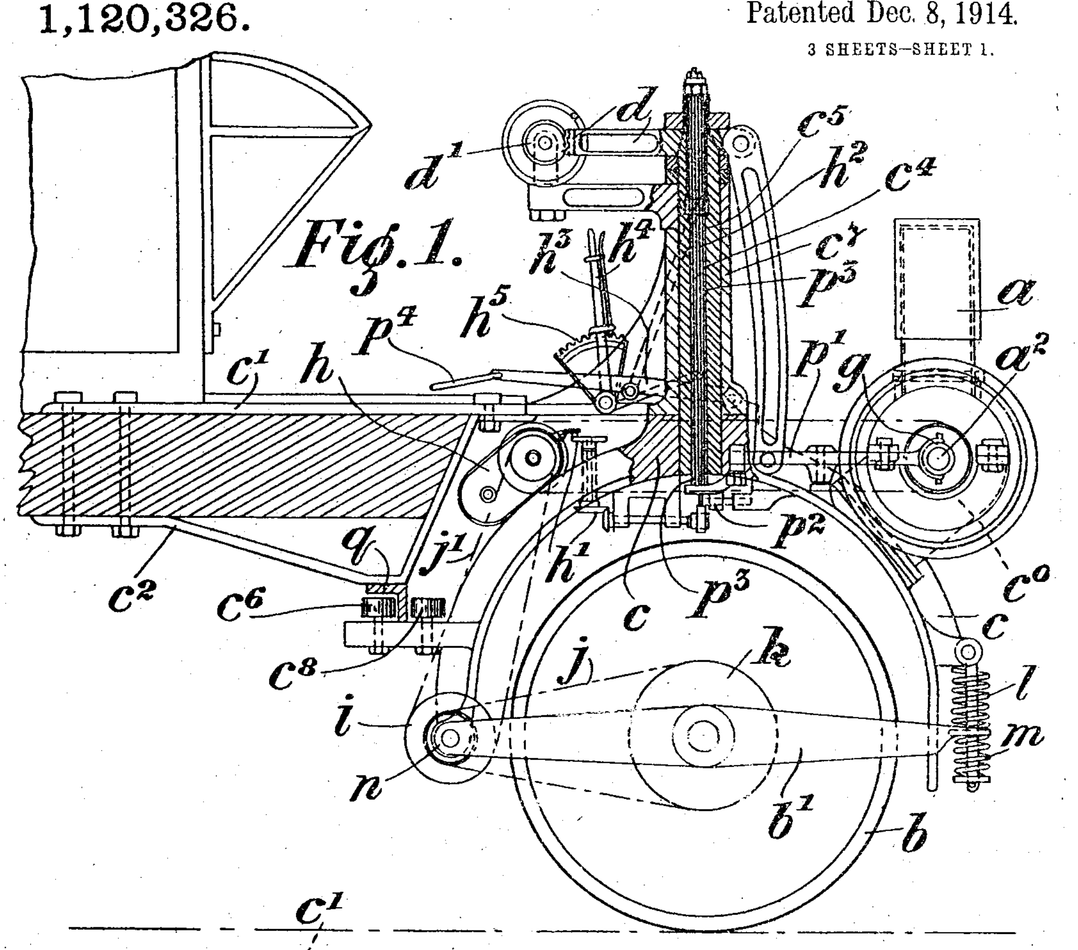
Figure 2:
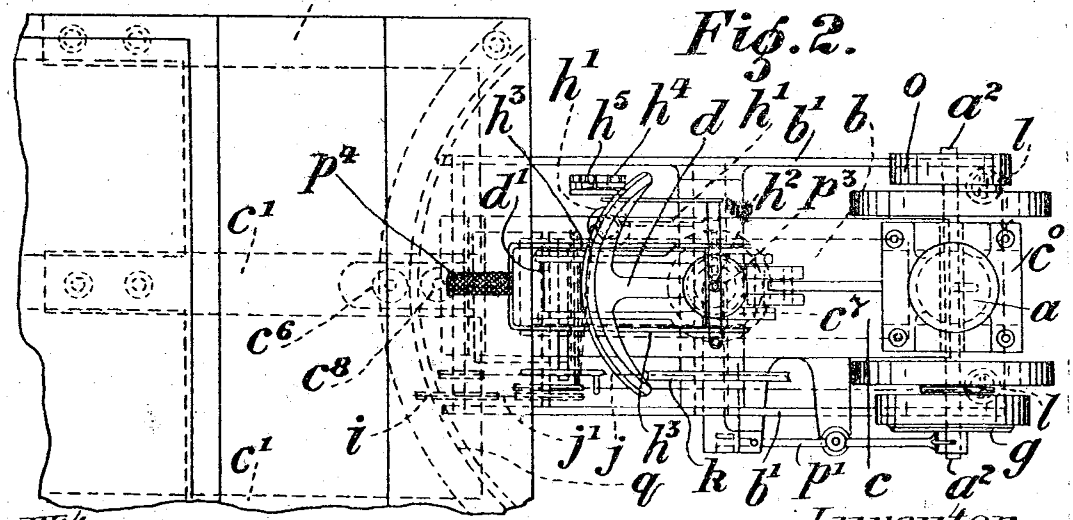

[illegible] I provide an improved [illegible] of the class described in [illegible] engine and driving road wheel [illegible] hollow spindle turnably [illegible] pillar the change speed [illegible] operating [illegible] through the [illegible] and a tube passing [illegible] the hollow steering spindle [illegible] therewith as described and shown in the annexed drawings, wherein:

Figure 1 is a side elevation, partly in section, of a power unit in accordance with my invention. Fig. 2 is a plan view of the same. Figs. [illegible] are enlarged detail views [illegible] the gear changing and [illegible] operating mechanism.

On the drawings the same reference letters where [illegible] repeated indicate the same or similar parts.

In carrying out my invention and as shown in the drawings, the self contained power unit comprises an engine or motor $a$ and a road wheel $b$ movably connected with a supporting member $c$ adapted to be removably secured to the front of any vehicle which the power unit is to drive, or when the power is to be used for other purposes this member $c$ could be removably secured to any suitable support. The road wheel $b$ is supported so that it can be turned for the purpose of guiding and turning the vehicle to which the power unit is attached, such turning being effected by a quadrant $d$ and worm steering gear $d'$, as shown in the drawings. The engine or motor $a$ is suitably supported in a cradle $c^6$ in front of the turnable connecting and supporting member $c$, and the drive from the engine or motor $a$ to the road wheel $b$ of the power unit is obtained through a clutch $g$ and gear box $h$ to a driving pulley or wheel $i$ arranged at the rear of the road wheel $b$ and from this driving pulley or wheel $i$ the drive $j$ to the road wheel pulley $k$ is obtained (chain gearing being preferably used as the driving medium) and the road wheel $b$ is so supported by levers or bars $b'$ that the drive is not affected by unevenness of the road and I may also provide eccentric bearings at $n$ by means of which any slackness of the drives $j$ and $j'$ can be taken up so that a proper tension is maintained on the driving chains at all times. I also provide springs $l$ and $m$ in the connection between the road wheel $b$ and the turnable part $c$ of the member which supports the engine or motor $a$ and which is connected with a supporting pillar $c^4$ provided with extensions $c^1$ and $c^2$ whereby same may be attached to a vehicle or other place, the springs $l$ and $m$ being provided for absorbing shock due to any unevenness in the road. I also provide on the engine or motor shaft $a^2$ a pulley $e$ or other means for transmitting power from the engine or motor $a$ when its power is required for other purposes than for the driving of a vehicle and in order that the power of the engine or motor may be used for other purposes when the power unit is attached to, or detached from, a vehicle I provide the clutch $g$ which is operable by the foot lever $p^4$ as follows:—The foot lever $p^4$ connects by links $p^6$ with a cross head $p^5$ on the top of the tube $p^3$ which is vertically movable in the hollow steering spindle $c^5$ so that the movements of the foot lever cause a corresponding up and down movement of the tube $p^3$. The end $p^7$ of a bell crank lever $p^2$ is connected to the lower end of the tube $p^3$ (see Figs. 3, 4, 4$^a$ and 4$^b$), the bell crank lever being pivotally supported at $p^9$ on a bracket $p^{10}$ and its other arm $p^{11}$ which projects at right angles to the arm $p^7$ is provided with a slot $p^{12}$ in which one end $p^{13}$ of the clutch operating lever is engaged, its other end $p^{14}$ being connected to the clutch $g$ while the lever is pivotally supported at $p^{15}$. The arrangement is such that on operating the foot lever $p^1$ the tube $p^3$ is raised or lowered and the bell crank lever $p^2$ is correspondingly moved about its pivot $p^9$ and as shown by the arrows in Fig. $4^b$ this causes a corresponding horizontal movement of the end $p^{13}$ of the clutch operating lever $p^1$ so that the clutch $g$ is thereby put into or out of gear as desired.

The gear box $h$ which is preferably of the well known "Panhard" type of sliding gear is provided with the usual and required number of speed changing and reversing gears.

Figure 5:
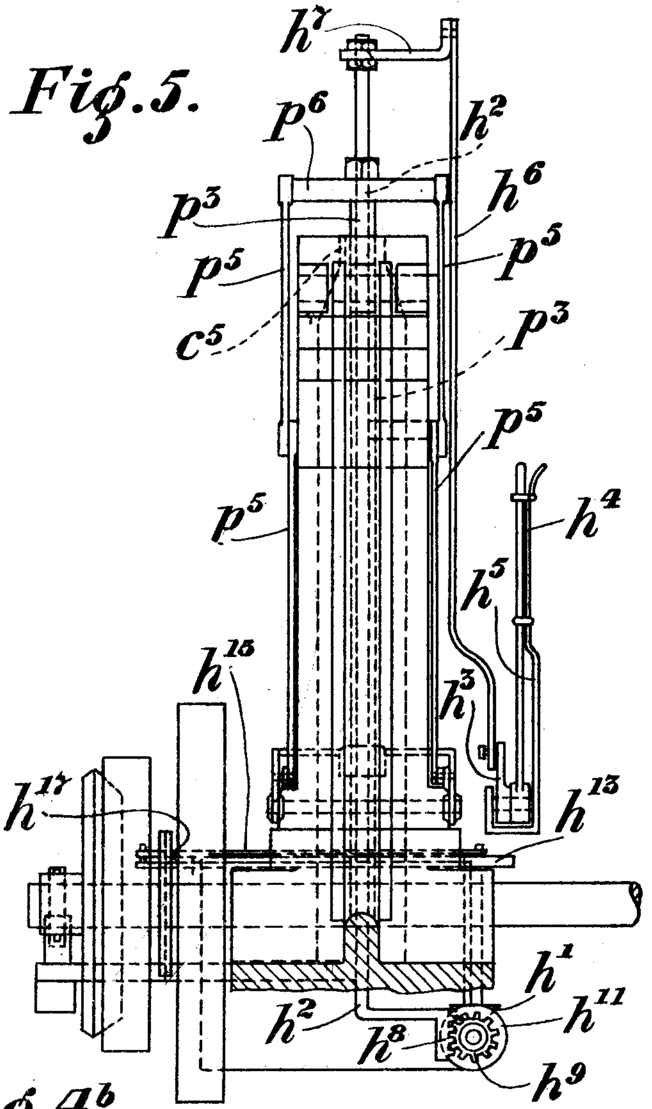

The changes in the gear are effected as follows;—A hand lever $h^4$ is provided and adapted to work in a sector $h^5$ (see detail drawings Figs. 3, 4 and 5) and secured to the lower end of this lever $h^4$ is a lever $h^3$ which is pivotally connected to a link $h^6$ which pivotally connects with a crosshead $h^7$ at the top of the rod or tube $h^2$ so that as the handle $h^4$ is moved over the sector $h^5$ a corresponding up or down movement is given to the rod or tube $h^2$. At the lower end of the tube $h^2$ I provide a rack $h^8$ meshing with a toothed wheel $h^9$ on the end of a horizontal shaft $h^{10}$ having at its other end a bevel wheel $h^{11}$ meshing with a bevel wheel $h^{12}$ at the lower end of a vertical shaft $h^{12}$ having at its upper end a disk $h^{13}$ to which one end $h^{14}$ of a rod $h^{15}$ is pivotally secured, the other end $h^{16}$ of the rod $h^{15}$ being pivotally connected to the usual sliding rod $h^{17}$ for changing the gear in the gear box $h$ in the well known manner. The arrangement is such that when the rod or tube $h^2$ is moved up or down by moving the handle $h^4$ as above described, the rack $h^8$ gives a corresponding turning movement to the toothed wheel $h^9$ which movement is in turn transmitted through the bevel wheels $h^{11}$ and $h^{12}$ to the disk $h^{13}$ and through the medium of the connecting rod $h^{15}$ the gear changing slide rod $h^{17}$ is moved as required. The gear and clutch operating tubes $h^2$ and $p^3$ respectively are concentrically arranged so that the tube $h^2$ is movable within the other tube $p^3$ and the tube $p^3$ is movable in a hole $c^4$ in the spindle $c^5$ of the supporting member $c$ so that the turning of the latter does not affect the gear changing and clutch operating mechanisms.

In order to take the thrust off the spindle or steering column $c^5$ I provide rollers $c^6$ and $c^8$ on the member $c$ and a bearing quadrant $q$ on the extension $c^2$ so that one of the rollers will bear on said quadrant when the vehicle is going ahead and the other will bear thereon when the vehicle is going backward.

Suitable water and fuel supply tanks or receptacles would be provided and conveniently supported on the framework of the power unit or elsewhere.

The power unit hereinbefore described is particularly adapted as a power unit for all classes of farmers, contractors, and commercial vehicles and it will be made and sold so that cart, lorry, and vehicle builders generally, can, by its use readily make or convert horse drawn vehicles into self propelled vehicles at the least possible cost and with a minimum of alteration to the vehicle.

Having now fully described my invention what I claim and desire to secure by Letters Patent is;—

1. A self contained power and steering unit for the propulsion and steering of vehicles or machines and also adapted for use as a prime mover when required comprising an engine mounted on a semi-circular frame at the lower end of a hollow spindle which is turnably supported in a hollow pillar having means whereby it can be removably attached to a vehicle or machine, a pair of levers pivotally connected at their one ends to one extremity of the semi-circular frame and at their other ends movably and resiliently connected with the other extremity of the semi-circular frame and intermediate their two ends the levers are adapted to support the road wheel of the machine and means for transmitting the drive from the engine to the road wheel and means connected with the hollow spindle whereby it may be turned as required for steering the vehicle or machine.

2. A self contained power and steering unit for the propulsion and steering of vehicles and machines and also adapted for use as a prime mover when required comprising an engine mounted on a semi-circular frame at the lower end of a hollow spindle which is turnably supported in a hollow pillar having means whereby it can be removably attached to a vehicle or machine, a pair of levers pivotally connected at their one ends to one extremity of the semi-circular frame and at their other ends movably and resiliently connected with the other extremity of the semi-circular frame and intermediate their two ends the levers are adapted to support the road wheel of the machine and means for transmitting the drive from the engine to the road wheel and means connected with the hollow spindle whereby it may be turned as required for steering the vehicle or machine, a bearing quadrant depending from the means for attaching the hollow supporting pillar to the vehicle or machine and rollers revolubly supported by the semi-circular frame and coöperating with the bearing quadrant so as to take the greater portion of the driving thrust off the hollow steering spindle.

3. A self contained power and steering unit for the propulsion and steering of vehicles or machines and also adapted for use as a prime mover when required comprising an engine mounted on a semi-circular frame at the lower end of a hollow spindle which is turnably supported in a hollow pillar having means whereby it can be removably attached to a vehicle or machine, a pair of levers pivotally connected at their one ends to one extremity of the semi-circular frame and at their other ends movably and resiliently connected with the other extremity of the semi-circular frame and intermediate their two ends the levers are adapted to support the road wheel of the machine and means for transmitting the drive from the engine to the road wheel and means connected with the hollow spindle whereby it may be turned as required for steering the vehicle or machine, a change speed gear intermediate the engine and the driving pulley of the road wheel, a disk, a connecting rod connected at one end to said disk and at the other end to the slide rod of the gear box, bevel gear for turning said disk, a rack and pinion for turning said bevel gear, a rod connected at one end with said rack and vertically movable within the hollow steering spindle its other end being connected to a crosshead above the steering spindle, said crosshead being connected by link gear with a hand lever whereby it can be raised and lowered for the purpose of causing the rack to turn the pinion wheel and give a corresponding turning movement to the bevel gear and disk whereby through the medium of the connecting rod the slide rod of the gear box is operated and the gear changed in the known manner.

4. A self contained power and steering unit for the propulsion and steering of vehicles or machines and also adapted for use as a prime mover when required comprising an engine mounted on a semi-circular frame at the lower end of a hollow spindle which is turnably supported in a hollow pillar having means whereby it can be removably attached to a vehicle or machine, a pair of levers pivotally connected at their one ends to one extremity of the semi-circular frame and at their other ends movably and resiliently connected with the other extremity of the semi-circular frame and intermediate their two ends the levers are adapted to support the road wheel of the machine and means for transmitting the drive from the engine to the road wheel and means connected with the hollow spindle whereby it may be turned as required for steering the vehicle or machine, a clutch on the engine shaft whereby the drive to the road wheel can be disconnected, a lever connected at one end to said clutch and pivotally supported on the semi-circular frame its other end being engaged in a slot in one end of a bell crank lever pivotally supported on the semi-circular frame the other end of said bell crank lever being pivotally connected to the lower end of a tube vertically movable within the hollow steering spindle and connected at its upper end to a crosshead above the steering spindle, said crosshead being connected by link gear with a foot lever whereby it can be raised and lowered for the purpose of oscillating the bell crank lever in one or other direction and correspondingly oscillating the lever which is connected with the clutch for the purpose of putting same into and out of gear as required.

In testimony whereof I affix my signature in presence of two witnesses.

WILLIAM MULHOLLAND.

Witnesses:

ANDREW HAMILTON,

HARRY WALTER ALLSOPP.